May 3, 1932.  L. D. A. RUSTIN ET AL  1,856,226
MULTIPLE WAY VALVE
Filed June 25, 1929

INVENTORS
Louis D. A. Rustin
Alfred J. G. Boland
BY Townsend + Decker
ATTORNEYS.

Patented May 3, 1932

1,856,226

UNITED STATES PATENT OFFICE

LOUIS DÉSIRÉ AUGUSTE RUSTIN, OF CLICHY-LA-GARENNE, AND ALFRED JEAN GUSTAVE BOLARD, OF VERNON, FRANCE, ASSIGNORS TO "RUSBOL," SOCIETE À RESPONSABILITE LIMITEE, OF CLICHY, FRANCE, A CORPORATION OF FRANCE

MULTIPLE-WAY VALVE

Application filed June 25, 1929, Serial No. 373,591, and in France July 12, 1928.

The subject of the present invention is a distributor providing for the distribution of a fluid (steam, gas, liquid) under low or high pressure in several directions at will, without necessitating the use of packing glands.

This distributor comprises essentially a disc forming a valve, with one of its faces perfectly ground and applied against a seating similarly ground so as to prevent any escape of fluid past their contact faces. This disc can rotate in a closed chamber under the control of a rod, preferably independent, and not provided with packing glands.

The disc has holes through it which allow the fluid to pass from the interior of this chamber in any desired direction.

The disc is kept on its seating by the pressure of the fluid, assisted if necessary by the action of springs which hold balls in certain of the admission holes not in use so as to keep it in place in each of its positions of distribution.

A joint made with leather, plastic metal, or other material ensures the tightness of the fixed parts of the casing.

Finally, the disc is preferably rounded on its periphery so that it can be displaced slightly and have a small amount of play in the casing if its seating is not absolutely perpendicular to the bore of the chamber.

The accompanying drawings show an embodiment of the invention.

Figure 2:
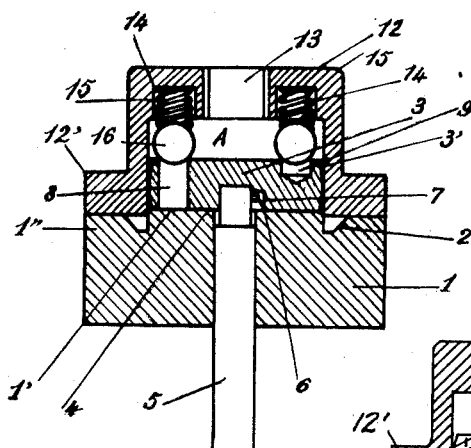
Figure 3:
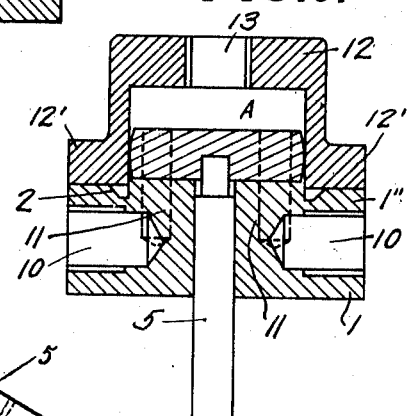
Figure 1:
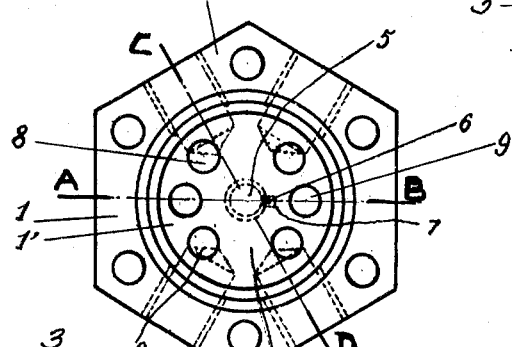
Figure 4:
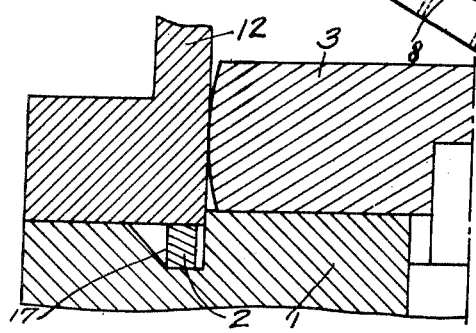

In the drawings, Figure 1 shows a view of the distributor in plan with cover removed; Figures 2 and 3 are two views showing sections through 2—2 and 3—3 of Figure 1; Figure 4 is a detailed view of the joint on a larger scale.

The distributor consists of a body 1, the upper part of which forms a seating 1' accurately ground surrounded by a groove 2 with its outer side sloping or chamfered as shown.

On the seating 1' is placed a disc or plate 3, the lower face of which is also accurately ground so as to ensure perfect contact with the seating 1'. This disc 3, the periphery of which is slightly rounded at 3', is provided with a hole 4 into which projects an independent control rod 5, passing without a packing gland, and even in certain cases with a slight clearance, through the body 1 of the apparatus. The rod 5 is provided with a pin 6 which engages with a corresponding recess 7 in the disc 3.

The disc 3 has five holes 8 through it and also a blind hole 9. 10 are four holes drilled in the body 1, each one corresponding with one outlet direction of the fluid to be distributed, these four holes communicating with passages 11 ending at the seating 1'.

Finally, the apparatus is closed by a cover 12, the edge 12' of which is secured to the edge 1" of the body 1 by bolts, no shown, and which has a hole 13 bored through it for the inlet of the fluid to be distributed. This cover has drilled in it two blind holes 14 in which are located springs 15 serving to press balls or other bearing members 16 into one or other of the holes 8—9 of the disc 3.

The operation of the distributor is as follows:—

The fluid entering the chamber A of the distributor at 13 passes into the free holes 8 of the disc and, according to the position given to the latter by movement of the rod 5, goes either by one of the passages 11 (communicating then only with one free hole 8) and into the corresponding duct 10, or by the four passages 11, communicating then with the four free holes 8, and into the four ducts 10.

Distribution is thus obtained either in one of four directions or in the four directions simultaneously.

The balls 16 entering one of the holes 8 and the hole 9 or two of the holes 8 according to the position of the disc 3, ensure that the latter is kept in place in the selected position of distribution. By means of the springs 15 a certain contact pressure of the disc on its seating is ensured at the same time, but this pressure is caused principally by the pressure exercised by the fluid to be distributed in the chamber A.

The fluid to be distributed cannot escape along the seating 1' and the rod 5 on account of the accurate grinding of the seating 1' and the face of the disc 3 in contact with it. It cannot escape between the contact faces of the body 1 and the cover 12 on account of a joint leather 17 arranged in the groove 2 as shown in Figure 3 and pressed hard against the inclined face of the latter by the fluid pressure. In a similar way in the groove 2 there could be provided a plastic metal joint of any known type or a joint of any other suitable material.

The rounding at 3' on the periphery of the disc is for the purpose of allowing the latter free play so that it can displace itself a little if necessary inside the cover 12 in case the ground face of the seating 1' should not be exactly perpendicular to the bore of the cover.

In certain arrangements of distributors it is possible to arrange that the balls, of which there are an appropriate number, or some of them are also used to close certain of the distribution holes 8.

What we claim is:—

1. A multiple-way valve comprising a casing formed with inlet and outlet openings and a valve seat adjacent the latter, a rotatable disc constructed for cooperation with said valve seat to form a valve proper, said disc including a series of holes positioned on a circle the center of which coincides with the axis of said disc which coincide with certain of said openings when said disc is rotatably adjusted to the proper position and means for pressing said disc against said valve seat and simultaneously securing the same in its adjusted position, said means including a spring-pressed ball mounted within said casing in position to engage within one of said holes.

2. A multiple-way valve comprising a casing formed with a plurality of outlet openings and a valve seat adjacent said openings, a valve plate adjustably mounted within said casing and formed with openings coinciding with said first-named openings, means within said casing constructed to coact with said last-named openings for releasably securing said plate in position on said valve seat and means for admitting fluid directly to the interior of said casing in position to press against the rearward or free face of said plate for further holding the same against said valve seat.

3. A multiple-way valve comprising a valve casing formed with a plurality of outlet openings and a valve seat adjacent the same, a rotatable disc mounted within said casing and formed with a plurality of openings and a valve face constructed for coaction with said first-named openings and valve seat to open or close said openings, a plurality of springs stationarily mounted within said casing and bearing members supported by said springs and forced thereby into certain of said second-named openings to retain said disc in its adjusted position.

4. A multiple-way valve comprising a valve casing formed with a plurality of outlet openings and a valve seat adjacent the same, a rotatable disc mounted within said casing and formed with a plurality of openings and a valve face constructed for coaction with said first-named openings and valve seat to open or close said openings, a plurality of springs stationarily mounted within said casing and bearing members supported by said springs and forced thereby into certain of said second-named openings to retain said disc in its adjusted position, said springs and bearing members being diametrically opposed with relation to the axis of rotation of said disc.

5. A multiple-way valve comprising a valve casing formed with a plurality of outlet openings and a valve seat adjacent the same, a rotatable disc mounted within said casing and formed with a plurality of openings and a valve face constructed for coaction with said first-named openings and valve seat to open or close said openings, a plurality of springs stationarily mounted within said casing and bearing members supported by said springs and forced thereby into certain of said second-named openings to retain said disc in its adjusted position, said disc having a rounded side edge, and means within said casing for engaging said side edge to prevent transverse movement of said disc.

In testimony whereof we have signed this specification.

LOUIS DÉSIRÉ AUGUSTE RUSTIN.
ALFRED JEAN GUSTAVE BOLARD.